Figure 1:
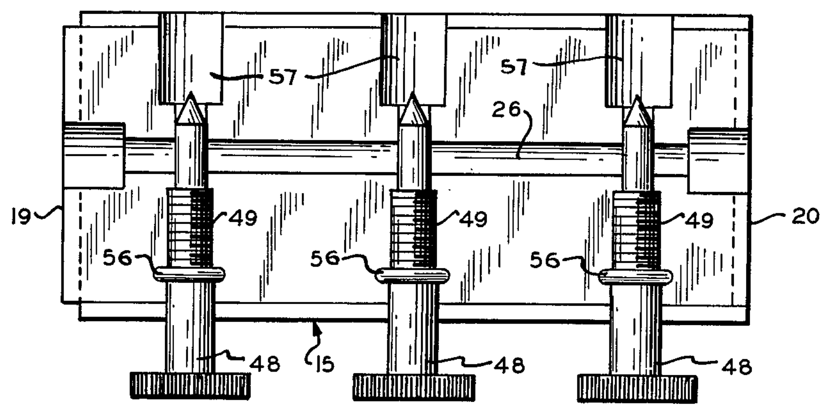

June 4, 1963 L. STARK 3,092,141

AIRFLOW CONTROL UNIT FOR AQUARIUMS

Filed Nov. 22, 1961 3 Sheets-Sheet 1

INVENTOR.
L. STARK

BY

ATTORNEY

June 4, 1963 L. STARK 3,092,141
AIRFLOW CONTROL UNIT FOR AQUARIUMS
Filed Nov. 22, 1961 3 Sheets-Sheet 2
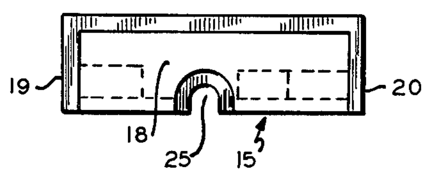
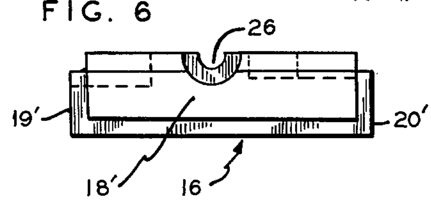
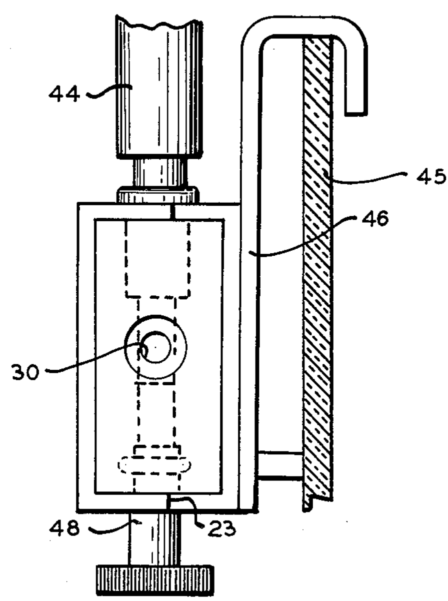
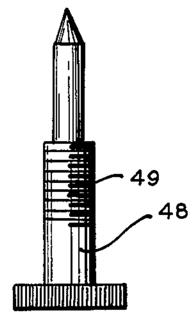
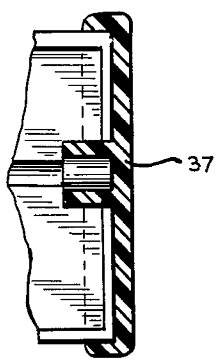
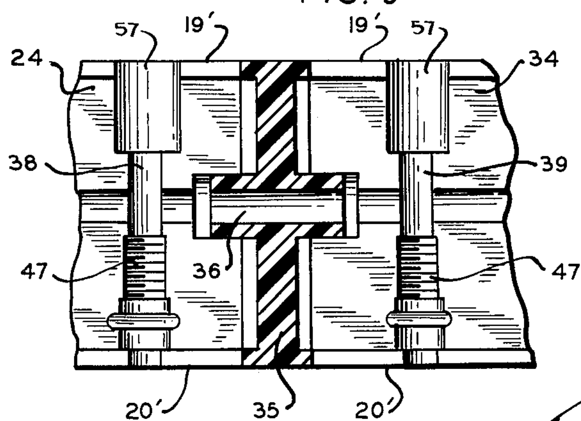
INVENTOR.
L. STARK
BY Harry ...
ATTORNEY June 4, 1963 — L. STARK — 3,092,141
AIRFLOW CONTROL UNIT FOR AQUARIUMS
Filed Nov. 22, 1961 — 3 Sheets-Sheet 3
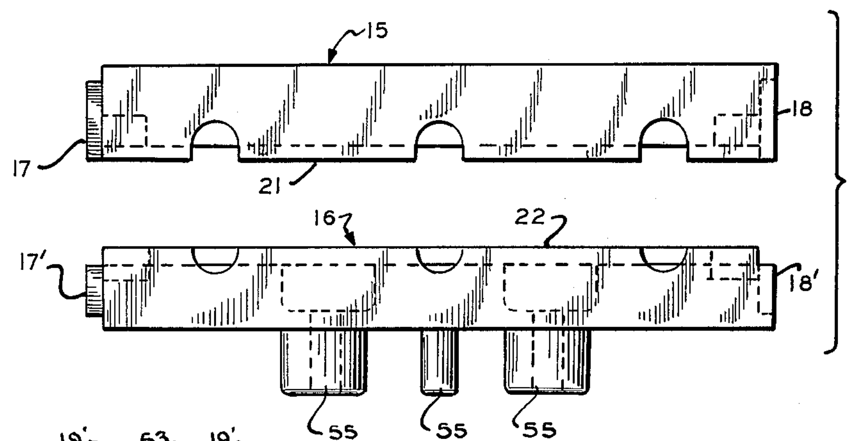
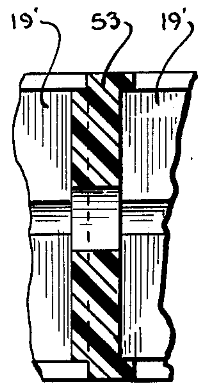
FIG. 12
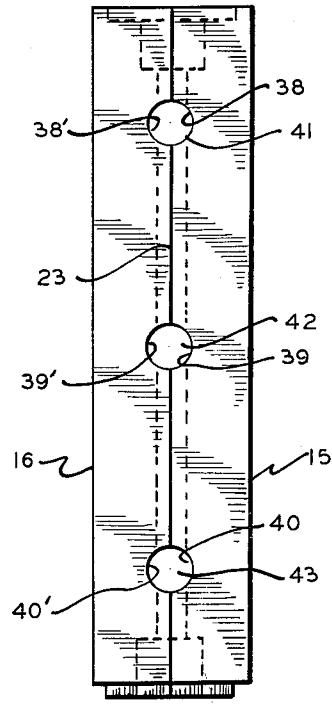
FIG. 13
INVENTOR.
L. STARK
BY [signature]
ATTORNEY United States Patent Office 3,092,141

Patented June 4, 1963

3,092,141

AIRFLOW CONTROL UNIT FOR AQUARIUMS

Ludwig Stark, Springfield, N.J., assignor to Springfield Tool and Die Co., Inc., Springfield, N.J., a corporation of New Jersey Filed Nov. 22, 1961, Ser. No. 154,234
2 Claims. (Cl. 137—608)

This invention relates to an airflow control unit for variable control of single or multiple gang valves and is especially adapted for air operated aquariums and accessories or other low volume applications. The control unit of this invention is adapted to be coupled to similar units or to be used singly as desired to provide positive airflow control for each of the air lines connected to the control unit and is of unique construction and operational features as below more particularly set forth; the device is adapted to be manufactured in quantities with uniform accuracy and is highly useful and reliable in service.

Figure 2:
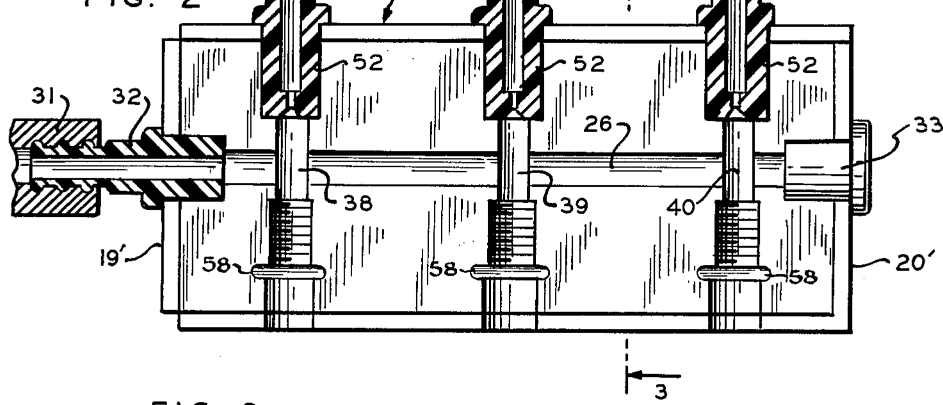
Figure 3:
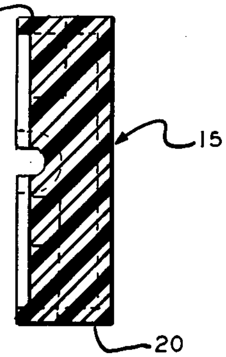
Figure 4:
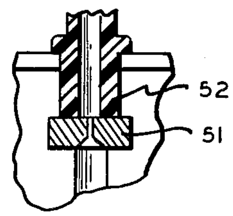

In the drawings:

FIG. 1 is a top plan view of one of the body sections of an airflow control unit embodying the invention, showing control valve stems positioned in the transverse air conduits thereof, FIG. 2 is a similar view of the complementary body section, with a plurality of air lines connected to the transverse air conduits thereof, an air supply line being shown connected to a longitudinal end of the unit, and a closure plug connected to the other end thereof, FIG. 3 is a transverse sectional view thereof, taken on line 3—3 of FIG. 2, FIG. 4 is a fragmentary plan view of a modified form of the invention, showing a valve seat disc formed separately from and disposed adjacent the inner end of tube 52, FIGS. 5 and 6 are end elevational views of body sections which may be assembled face to face to form an air control unit in accordance with the invention, FIG. 7 is an end elevational view of a unit embodying the invention shown fixed to a bracket to secure the same to an aquarium wall, the latter being shown fragmentarily, FIG. 8 is a top plan view of a needle valve stem which may be used in connection with the invention, FIG. 9 is a fragmentary end view of units of the invention connected at 35, FIG. 10 is a fragmentary similar view of the ends of one of said units shown closed at 37, FIG. 11 is a side elevational view of the complementary body sections of an air flow control unit embodying the invention, FIG. 12 is a fragmentary plan view, similar to FIG. 11, but showing another form 53 of connector for the unit, and FIG. 13 is a side elevational view of a unit embodying the invention.

In the drawings an airflow control unit of this invention is shown to comprise a pair (15, 16 of FIG. 13) of flat body sections of substantially like dimensions having longitudinal ends 17, 17′ (FIG. 12) and transverse ends 19, 20, 19′, 20′ (FIGS. 5 and 6). The body sections are perfectly made of a plastic or other suitable material and are adapted to be secured together at one of the faces thereof (21, 22, FIG. 11) by the use of adhesive, heat or other sealing means at the point of abutment 23, FIG. 13 of said faces on assembly, uniting said sections 15, 16 into a complete airflow control unit. Each of said sections has formed therein medially longitudinally a semicircular recess 25, 26 (FIGS. 5 and 6), said recesses (on so securing said sections together as above noted) defining the longitudinal air receiving channel 30 (FIG. 7) adapted at one longitudinal end thereof to receive a coupling tube 32 for connection of said unit with a source of air under pressure as through an air hose 31 leading from a pump. Means engage body recess 30 at the other end thereof, such as a connector plug 33 (FIG. 2) or 37 (FIG. 10) or 53 (FIG. 12) or, where the unit is to be connected to additional airflow control units such as exemplified at 34 in FIG. 9, a suitable coupler tube 35 may connect opposite longitudinal ends of channels 30 of the units, closing said ends but providing an air opening 36 therethrough or said units may be directly connected end to end.

Complementary recesses 38, 39 and 40, 38′, 39′, 40′ (FIGS. 2, 13) are formed in the faces of the body sections in spaced parallel relation transversely to longitudinal axis thereof and opening into the longitudinal recesses 25, 26. Said complementary transverse recesses 38, 39 and 40, 38′, 39′, 40′, on so securing such sections together, form transverse air conduits 41, 42, 43 (FIG. 13) for the flow of air from the longitudinal air channels 26 through the transverse recesses and into the air flow tubes 44 (FIGS. 2, 7) positioned at one end of said transverse recesses said tubes leading to the aquarium marked fragmentarily at 45 in FIG. 7, for aerating purposes. The unit may be secured to an aquarium hanger 46 (FIG. 7) directly or by bosses 55 (FIG. 11) for convenience of use.

Complementary threaded valve receiving portions 47 (FIG. 9) are formed at one of the ends of the transverse recesses, and needle valve stems 48 preferably formed of a material of greater hardness (such as metal) (FIG. 8), are provided with complementarily threaded portions 47 of the body sections 15, 16. The free ends of the needle valves are engageable with complementary valve seats formed as individual discs 51 (FIG. 4) positioned in semicircular recesses in the transverse recesses of the body sections or said valve seats may be formed unitarily as part of the tubes 52 (FIG. 2) positioned in transverse recesses and connecting them with the airflow tubes 44 to the tank or other point of application of air. The valve sections are formed with complementary recesses (FIG. 1) to receive the tubes 52 and recesses 57 to receive the rings 56 unitary with or formed separately from the valve stems 48.

The drawings, illustrating procedures and devices useful in carrying out the invention, and the description above, are exemplary only of the invention, which shall be deemed to cover all other devices and procedures coming within the scope and purview of the appended claims.

Having thus described my invention, what I claim as new and desire to secure by Letters Patent is:

1. An air flow control unit for aquariums comprising a pair of flat body sections of substantially like dimensions adapted to be secured together at one of the faces thereof substantially unitarily, said face of each section having formed therein medially longitudinally a channel semicircular in cross-section, said semicircular channel, on so securing said sections together, defining a longitudinal air receiving passage in said unit for coupling at one longitudinal end thereof of the unit with a source of air under pressure, means engaging the body sections for closing the other end of said channel, complementary recesses formed in said faces of the body sections in spaced parallel relation transversely to the longitudinal axis thereof and opening into the longitudinal channel, said complementary recesses, on so securing said sections, together defining transverse air conduits for flow of air from the longitudinal air channel, tubular insert means engaging one end of the transverse conduits for connection of aquarium air tubes therewith, said means having a valve seat at its inner end, complementary threaded portions formed in the opposite ends of said transverse air conduits and needle valve stems threadedly and rotatably journalled in said threaded portions and disposed in said transverse air conduits, and adapted to cooperate with said seats for controlling the flow of air through said aquarium air tubes.

2. In an airflow control unit as set forth in claim 1, said body sections being formed of plastic material and said needle valve stems being formed of a material of greater hardness.

References Cited in the file of this patent

UNITED STATES PATENTS

| | | |
|---|---|---|
| 2,598,961 | Andrus | June 3, 1952 |
| 2,617,171 | Kimmel | Nov. 11, 1952 |
| 2,871,881 | Hewson | Feb. 3, 1959 |
| 2,931,387 | Fleming | Apr. 5, 1960 |